United States Patent Office 3,398,905
Patented Aug. 27, 1968

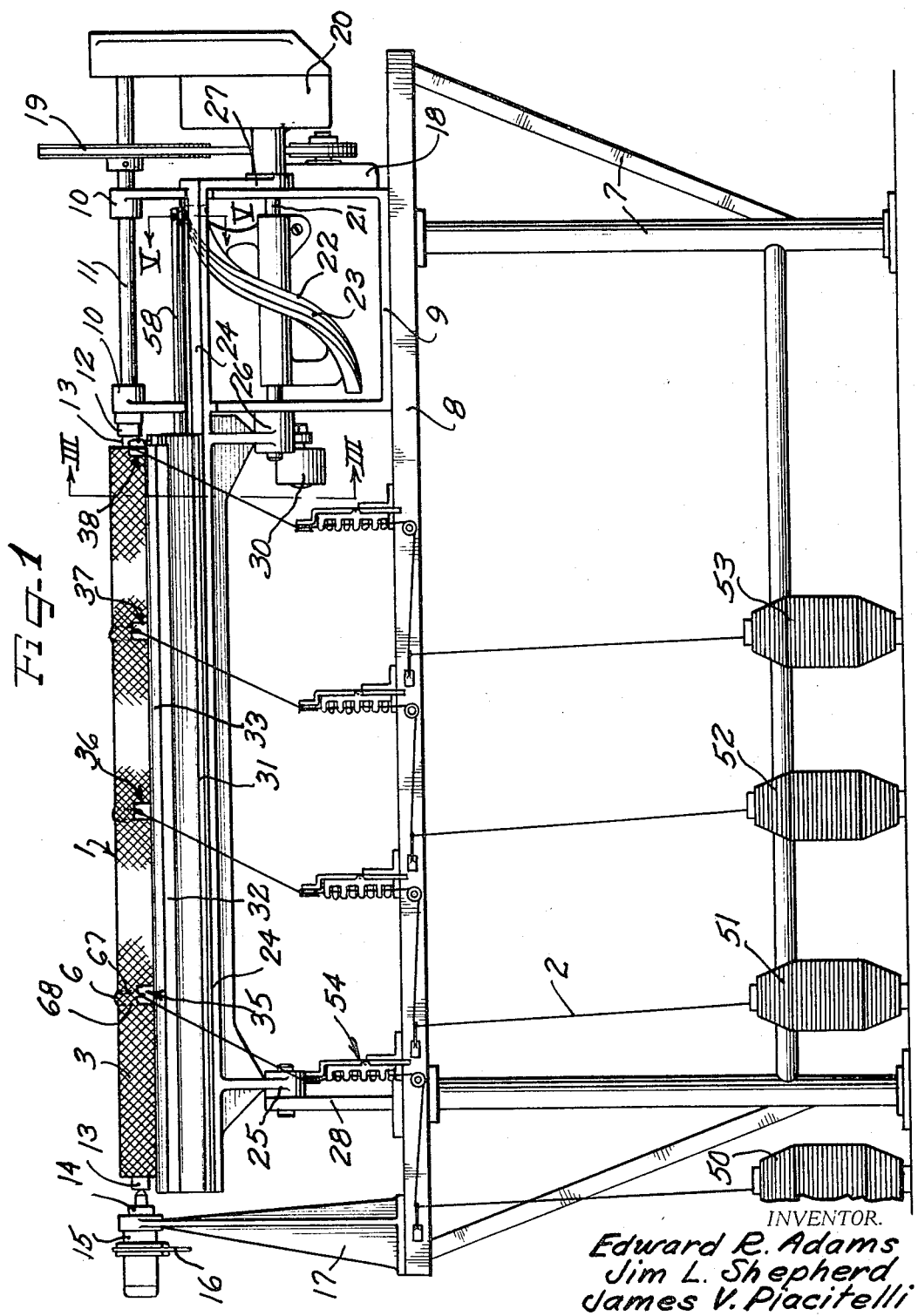

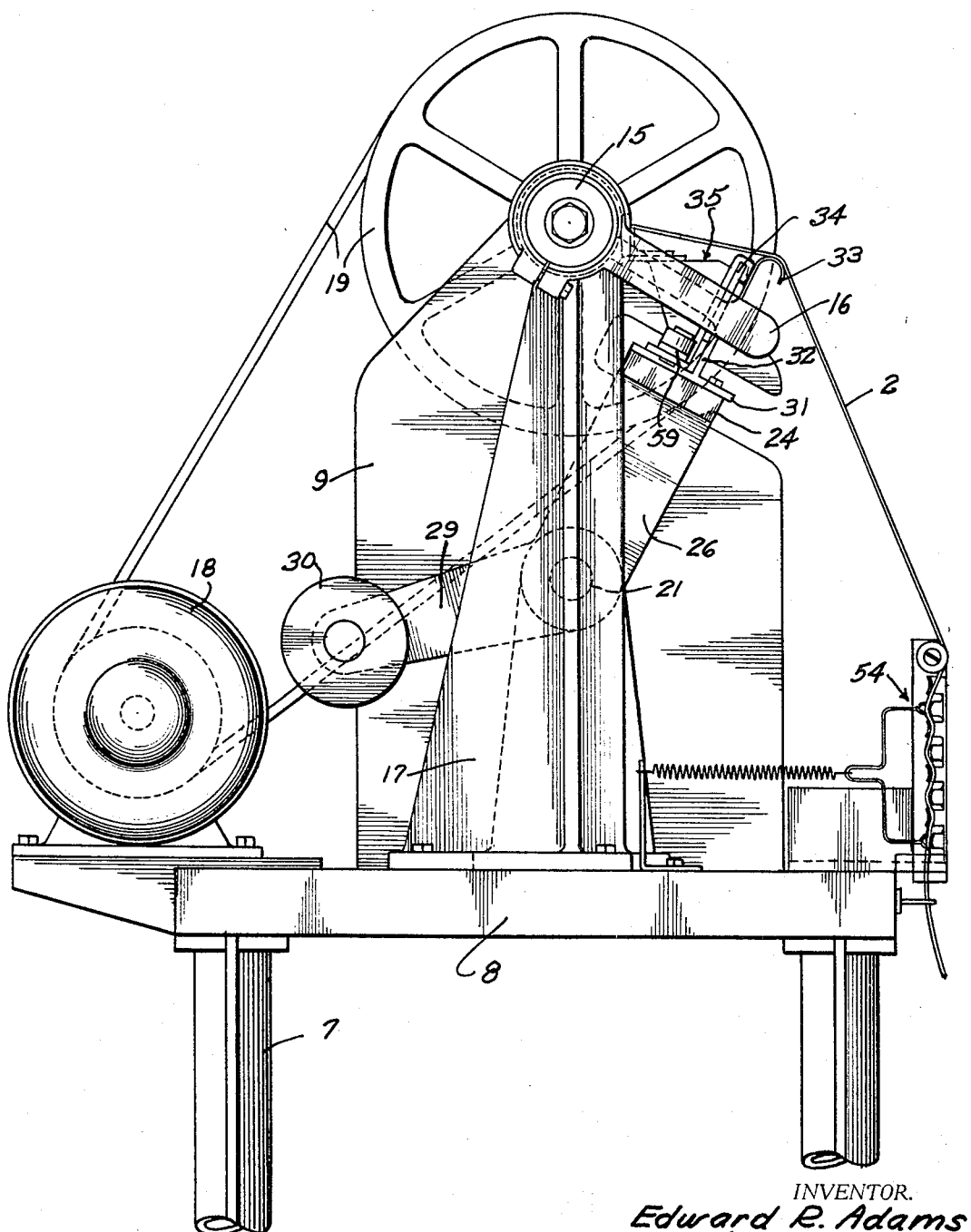

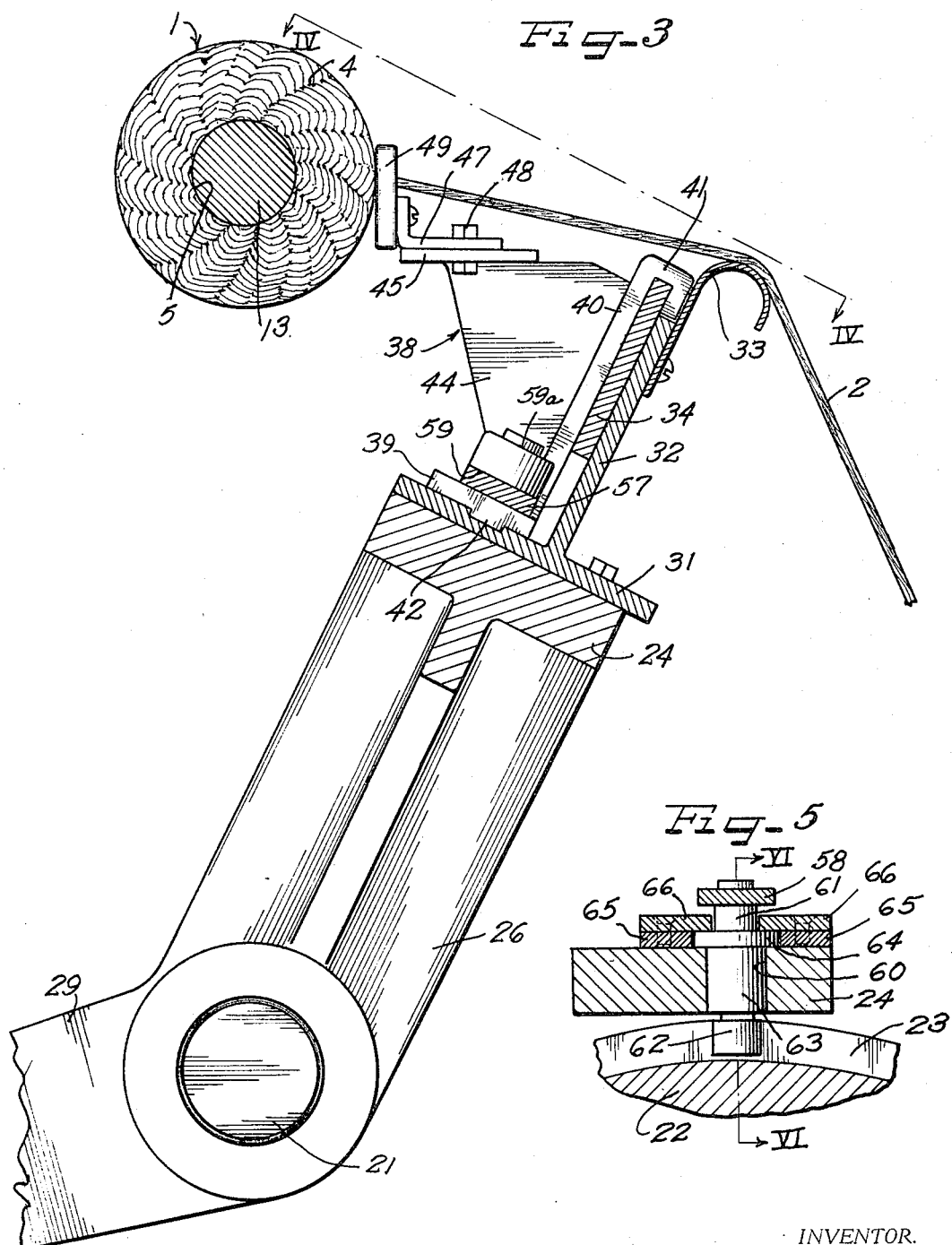

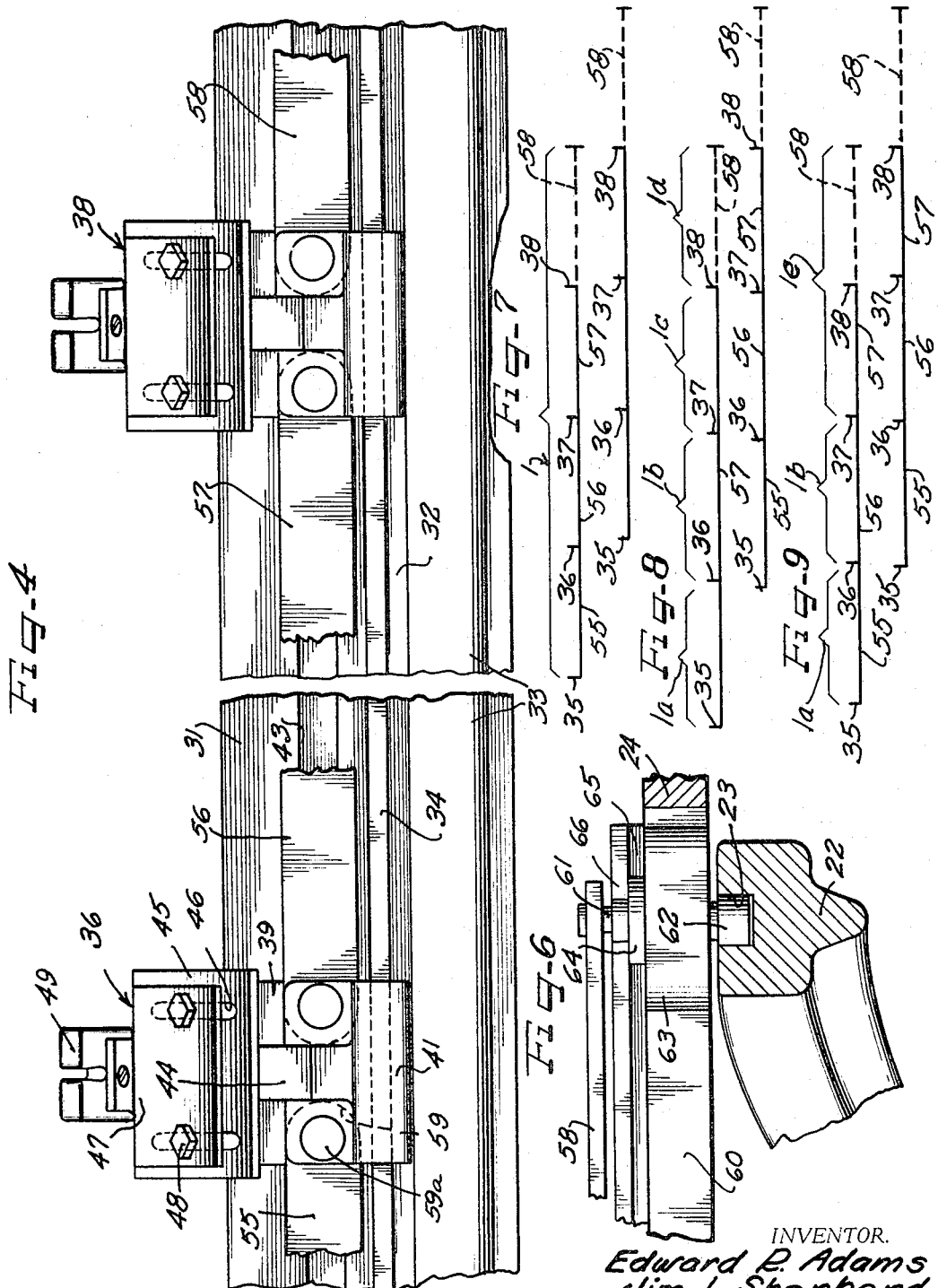

3,398,905
APPARATUS FOR MAKING FILTER TUBES
Edward R. Adams and Jim L. Shepherd, Lebanon, Ind., and James V. Piacitelli, Dedham, Mass., assignors to Commercial Filters Corporation, Lebanon, Ind., a corporation of New York
Filed July 18, 1966, Ser. No. 566,042
5 Claims. (Cl. 242—35.5)

ABSTRACT OF THE DISCLOSURE

Apparatus for making filter tubes of helically wound roving, the apparatus embodying a rotary mandrel adjacent which a series of spaced roving guides are reciprocated in unison each supplying roving to a filter section wound on the mandrel, the spacing between guides being so adjustable as to permit interwinding at the adjacent ends of the adjacent sections to permanently unite the sections into a single elongated filter, and adjustable to maintain adjacent sections spaced apart to provide individual shorter filter tubes.

---

This invention relates to improvements in an apparatus for making filter tubes, and more particularly to apparatus for making a filter tube comprising helically wound layers of fibrous or fuzzy yarn or roving, although the apparatus may have other uses and purposes as will be apparent to one skilled in the art.

In the past, filter tubes of helically wound napped roving were commonly made approximately 10 inches in length, but in many installations tubes of 20, 30 or 40 inches in length are desirable, and with tubes as made commonly in the past, it would be necessary to stack shorter tubes one upon the other in order to provide the adequate length. Adequate sealing means would have to be provided between the abutting ends of the tubes to prevent by-passing of unfiltered liquid at such points, and when the tubes were fully contaminated and replacement was necessary it involved an expensive, arduous and laborious task.

With the foregoing in mind, it is an important object of the instant invention to provide a machine or apparatus for winding filter tubes, which is adjustable to make tubes of substantially any desired length within a relatively wide range of lengths.

Also an important object of this invention is the provision of apparatus for rapidly making an elongated filter tube by simultaneously winding different sections of the tube and interwinding or overlapping adjacent section ends in order to unify the complete tube.

A further desideratum of this invention is the provision of apparatus for winding filter tubes, which apparatus embodies a plurality of separate roving guides each fed by a different bobbin of yarn, whereby a plurality of separate tubes or joined tube sections may be selectively obtained by the simple expedient of adjusting the distance between roving guides.

Still another object of this invention is the provision of apparatus for winding filter tubes, which apparatus is readily adjustable to make filter tubes of different lengths at the same time and about the same mandrel.

While some of the more salient features, characteristics and advantages of the instant invention have been above pointed out, others will become apparent from the following disclosures, taken in conjunction with the accompanying drawings, in which:

FIGURE 1 is a fragmentary front elevational view of a machine embodying principles of the instant invention;

FIGURE 2 is an enlarged fragmentary end elevational view of the structure of FIGURE 1, taken from the left-hand end of FIGURE 1;

FIGURE 3 is an enlarged fragmentary vertical sectional view taken substantially as indicated by the line III—III of FIGURE 1, looking in the direction of the arrows;

FIGURE 4 is a fragmentary plan view of the roving guide mechanism, taken substantially as indicated by the line IV—IV of FIGURE 3;

FIGURE 5 is an enlarged fragmentary vertical sectional view taken substantially as indicated by the line V—V of FIGURE 1;

FIGURE 6 is an enlarged fragmentary vertical sectional view taken substantially as indicated by the line VI—VI of FIGURE 5;

FIGURE 7 is a diagrammatic view illustrating the setting of the roving guides for winding a single elongated filter tube;

FIGURE 8 is a diagrammatic showing of the setting of the roving guides for the winding of four separate filter tubes; and FIGURE 9 is a diagrammatic showing of the setting of the roving guides for winding tubes varying in length.

As shown on the drawings:

The filter element or cartridge made by the instant invention is seen in FIGURES 1 and 3, and generally indicated by numeral 1. This element consists of a helically wound fibrous yarn or roving, the yarn being wound in successive layers of spaced helical convolutions alternating in direction to provide a crisscross pattern. The general structure of the element and the winding thereof is more fully set forth and described in Maurice A. Goldman U.S. Letters Patent No. 1,958,268 issued May 8, 1934, or in the Hastings Reissue Patent No. Re. 22,651 issued June 12, 1945, depending upon the desired direction of the napping in the finished product.

For winding the filter element, a fuzzy or fibrous yarn 2 of cotton fibers, viscous rayon, cellulose acetate, or other synthetic fiber may be utilized, the yarn resembling a rove. The helical backward and forward winding results in the provision of substantially diamond-shaped openings 3 between successive layers, and these openings gradually increase in size as the diameter of the filter element being wound increases, and the crossing points of the convolutions are moved slightly as to circumferential position during the winding. This operation results in curvate tunnels 4 appearing in the element, and fluid to be filtered passes through these tunnels. Before or during the winding of the yarn 2 the yarn is napped by any suitable napping mechanism, not shown, to provide fine fibers extending across the tunnels or passages 4, there being a myriad of such fibers across each passage. By way of example, a filter element substantially 20 inches long 2½ inches in diameter, with an unrestricted passage 5 lengthwise therethrough of approximately 1 inch in diameter, may have 600 or more of such passages 4.

With the instant invention, it is possible to simultaneously wind a plurality of filter tubes of the same length, or a plurality of filter tubes of different makes. It is also possible to wind a single long filter tube by simultaneously winding segments of the tube, and interwinding adjacent segments for a relatively short distance to unify the segments into a single filter tube. This is accomplished by slightly overlapping the winding of one segment with that of the adjacent segment, and vice versa, so that the segments are effectively joined one to the other. The uniting of segments in that fashion results in a slight increase in diameter of the filter tube at the point where the segments are interlocked, as indicated by numeral 6 in FIGURE 1. The interlocking of adjacent segments does not interfere noticeably with the efficacy and efficiency of the composite unitary filter tube. The interwinding area need not be of any considerable extent, it usually being satisfactory for the interlocking band to be ⅜ to ½ inch in width for adjacent segments each approximating 9 or 10 inches in length.

The winding of a long filter tube by simultaneously winding separate segments of the tube obviously greatly increases rapidity of production. The selectivity of length of the filter tube or tubes being wound adds materially to the universality of the machine or winding apparatus. Both these arrangements may readily be accomplished by simple adjustments to the parts of the winding apparatus embodied in this invention.

The illustrated embodiment of the winding machine or apparatus includes suitable undersupporting means 7 for a bed plate or table 8 upon which the main portion of the winding mechanism is mounted. Secured on the bed 8 adjacent one end thereof is an upstanding generally U-shaped frame 9 carrying a pair of spaced bearings 10—10 on the upstanding arms thereof, with the shaft 11 journalled in these bearings. On one end thereof the shaft carries a chuck 12 or equivalent means for removably engaging and supporting an end of an elongated mandrel 13 around which the filter tubes are wound. The other end of the mandrel is removably supported by a rotary spindle 14 carried by a chuck 15 or the equivalent, controlled by an operating handle 16, and such assembly is carried at the top of a support 17 upstanding from the other end of the bed 8.

The shaft 11 and consequently the mandrel 13 are driven by means of an electric motor 18 or any other suitable power source, through a reduction pulley system 19, as seen in FIGURES 1 and 2. The outer end of the shaft 11 extends into and is connected with a gear reduction unit 20 which drives a cam shaft 21 disposed parallel to and beneath the shaft 11. The shaft 21 carries thereon a barrel cam 22 having perimetrical cam track 23 therein. As will be more apparent later herein, it is this cam 22 which actuates the movable components of the filter tube winding mechanism. The cam is effective through a complete revolution of the shaft 21, the opposite side of the cam being of complemental configuration to the visible side in FIGURE 1 and thus hidden by the visible side.

The winding mechanism includes an elongated bar 24 which extends across the machine in front of the mandrel 13 and over the cam 22. This bar is supported on arms 25, 26 and 27, as seen best in FIGURES 1 and 2, the arm 25 being pivoted to a stub shaft carried in an upright 28, and the arms 26 and 27 being pivotally connected to the aforesaid cam shaft 21, but the cam shaft is rotary relatively to the arms 26 and 27. As seen in FIGURES 1, 2 and 3, the arm 26 is L-shaped, and the pivot connection with the shaft 21 is at the elbow of the arm. The rearwardly extending portion 29 of the arm hangs free but carries on its free end a counterweight 30, and this counterweight tends to bias the bar 24 at all times toward a vertical plane which includes the axis of the mandrel 13.

Mounted on the bar 24 in the region thereof adjacent the mandrel 13 is an inverted T-bar having a base flange 31, and an upstanding flange or leg 32, this inverted T-bar extending a distance at least equal in length to the mandrel 13. An elongated curvate strip 33, equal in length to the T-bar, is secured to the upper part of the leg 32 so as to extend thereabove, as best seen in FIGURE 3, this strip providing free non-snagging travel for the roving over the curved portion thereof. A flat traverse bar 34 is secured to the opposite face of the leg 32 so as to extend edgewise thereabove and in effect form a track for the travel of roving guide assemblies, the traverse bar also being substantially the same length as the T-bar.

A plurality of roving guide assemblies are disposed for left and right reciprocatory movement along the base flange 31 of the T-bar and along the traverse bar 34. In the illustrated instance there are four such roving guide assemblies, generally indicated by numerals 35, 36, 37 and 38. The roving guide assemblies are all identical in construction.

With reference now to FIGURES 3 and 4, it will be seen that each guide assembly enbodies a block 39 which may satisfactorily be a casting. The block has an upstanding wall 40 the upper part of which is turned outwardly and downwardly as indicated at 41, to embrace the upper margin of the traverse bar 34. The base of the block is provided with a depending rib 42 which rides in a suitable groove 43 in the base flange 31 of the aforesaid T-bar. With these separate points of slidable engagement with the T-bar, the block is maintained in proper position at all times during its reciprocatory movement relatively to the T-bar. Centrally thereof, the block has an upstanding rib 44 which projects inwardly toward the mandrel 13. On the inner upper portion thereof the rib carries a flat platform 45 provided with a pair of spaced elongated slots 46. On this platform an angle bracket 47 is adjustably mounted by means of bolts 48 extending through the elongated slots. A notched roving guide 49 is secured to the upstanding flange of the angle bracket 47. The strand of roving 2 passes through the notch in the roving guide 49 which is maintained in contact with the filter tube being wound by virtue of the aforesaid counterweight 30 tipping the bar 24 in the direction of the mandrel 13. Each roving guide assembly is supplied from a different bobbin of yarn, bobbins 50, 51, 52 and 53 supplying respectively roving guide assemblies 35, 36, 37 and 38, as seen best in FIGURE 1. In each instance, the roving 2 emanating from each bobbin passes through an adjustable pressure tensioning device, generally indicated by numeral 54 of a known character. As shown, the tensioning devices may be readily mounted on the bed 8 of the machine.

The roving guide assemblies are maintained in spaced relationship, and the spacing between adjacent guides may be varied whenever desired. This spacing is maintained by means of connecting rods 55, 56 and 57, connecting rod 55 being disposed between guide assemblies 35 and 36; connecting rod 56 between assemblies 36 and 37; connecting rod 57 between assemblies 37 and 38; and there is a further connecting rod 58 which connects roving guide 38 with the aforesaid barrel cam 22. As seen in FIGURES 3 and 4, the end of each connecting rod enters a notch 59 in the block of a respective roving guide assembly, and a pin 59a is dropped through a suitable aperture in the portion of the block above the notch and also through an aligned aperture in the end of the connecting rod. In this manner, connecting rods may be easily disconnected and connected without the use of any special tools and in a very rapid manner. It is a simple expedient to vary the distance between any adjacent pair of roving guide assemblies by substituting a connecting rod of a different length between any selected pair of assemblies. Connecting rods 55, 56 and 57 are provided in sets of different lengths and a substitution may be had very quickly at any time desired. This is deemed more expedient because accurate adjustment depends upon the length of the respective connecting rod, and is easier and more quickly obtained than were the roving guide assemblies adjustably mounted on a single elongated rod. The connecting rod 58 may always remain of the same length, since the length of stroke imparted by the cam 22 will remain constant.

To establish a connection between the outer end of the connecting rod 58 and the barrel cam 22, the aforesaid bar 24 is provided with an elongated slot 60 in that portion of the bar extending above the cam. Through this slot a stud 61 extends, the connecting rod 58 being attached to the top of the stud in a manner to permit relative rotation therebetween, and the lower end of the stud carries a rotary cam rider 62 which projects into the cam groove 23 of the barrel cam, as best seen in FIGURES 5 and 6. The stud 61 is provided with a laterally elongated portion 63 which rides within the slot 60 in the bar 24, this portion causing the stud to smoothly and securely move within the slot. The stud is maintained in proper position at all times, by virtue of an enlarged lateral flange 64 thereon, which rides between a pair of relatively narrow spaced strips 65—65 while the neck of the stud above the flange 64 rides between a wider pair of strips 66—66, which said strips are secured to the top of the bar 24 as seen clearly in FIGURE 5.

In operation, the instant invention is both positive and rapid. As the structure is illustrated in FIGURE 1, the filter tube 1 being wound is an elongated tube in which four separate sections are simultaneously wound, each section being interconnected with an adjacent section to ultimately form an integral elongated filter unit. In FIGURE 1 the roving guide assemblies are shown at the end of the right-hand stroke or in their most right-hand position. A single revolution of the cam 22 moves the roving guides to an extreme left-hand position with the assembly 35 at the left end of the unit being wound and returns the roving guides to the position seen in FIGURE 1. During such reciprocatory cycle, it will be noted that the roving guide of assembly 35 delivers yarn to the line 67 on its right-hand stroke, while the roving guide of assembly 36 delivers yarn to the line 68 on its left-hand stroke. In other words, the roving guide of assembly 35 travels to the right to a point beyond the limit of travel of the roving guide of assembly 36 to the left, and consequenlty there is an interwinding or interlocking between the adjacent ends of each pair of sections as indicated at 6 which in effect unites all of the sections into one integral tube. The completion of the filter tube is thus much more rapid than would be the case if a single roving guide was reciprocated backwardly and forwardly over the entire length of the mandrel.

This operation is shown diagrammatically in FIGURE 7, wherein the short vertical lines are exemplary of the roving guide assemblies, the horizontal lines of the connecting rods, and the dotted portion exemplifies connecting rod 58 which is of a length corresponding to the full left-hand stroke caused by the cam 22. The upper line of the figure shows the parts in the extreme left-hand position and the lower line shows the parts in the extreme right-hand position, while the bracket designates the length of filter tube being formed. In this instance, connecting rods 55, 56 and 57 are of the same length, but each is shorter than connecting rod 58. Therefore, as the connecting rods move backwardly and forwardly, the roving guide of assembly 36 goes to the left beyond the point the roving guide 35 reaches to the right and the same is true of the other roving guides, whereby the interwinding and interlocking of the filter tube section is established. The resultant tube is one single tube made up of the four simultaneously wound sections.

In FIGURE 8 we have diagrammatically illustrated the winding of four separate filter tubes, each of a relatively short length, all the tubes being wound simultaneously upon the same mandrel. In this instance, the connecting rods 55, 56 and 57 are again of equal length, but each is slightly longer than the connecting rod 58. Consequently, the roving guide of assembly 35 at the end of its right-hand stroke does not reach the point where the roving guide of assembly 36 stopped at the end of its left-hand stroke. Therefore there is no overlapping of travel of the roving guides and no interwinding or interlocking of the elements being wound, each being a separate and individual filter tube, designated by the numerals 1a, 1b, 1c, and 1d.

In FIGURE 9 a still different arrangement is diagrammatically shown, wherein two separate short filter tubes 1a and 1b are simultaneously formed along with one longer or double segment tube 1e. In this instance, connecting rods 55 and 56 are of the same length but each is longer than connecting rod 58, while connecting rod 57 is shorter than connecting rod 58, thereby causing overlapping between the roving guides of assemblies 37 and 38 during their left- and right-hand strokes.

From the diagrammatic showings in FIGURES 7, 8 and 9, it is at once apparent that the machine may readily be adjusted for the simultaneous winding of separate filter tubes of the same or varying lengths, or for the winding of a single elongated tube by simultaneously winding separate sections thereof and joining each section end to end with an adjacent section. Numerous other arrangements in addition to those shown in FIGURES 7, 8 and 9 will readily occur to one skilled in the art. Should it not be desired to wind a particular tube or portion thereof, the respective roving guide may be devoid of yarn. The adjustment of the machine to accomplish the winding of a tube or tubes of desired length is simple and rapid by merely substituting connective rods of the proper length to effect the desired result.

It will be understood that modifications and variations may be effected without departing from the scope of the novel concepts of the present invention.

We claim as our invention:

1. A machine for making filter tubes of helically wound roving, which machine embodies a mandrel, means to rotate the mandrel, and roving guides reciprocable in unison along the mandrel each to feed roving to a filter section being wound on said mandrel, wherein the improvements comprises removable connecting means interconnecting said roving guides to permit selective adjustment of the space between adjacent guides, and certain of said connecting means being of such length as to bring adjacent guides sufficiently close together as to cause an interwinding of the roving of adjacent filter sections to permanently join the sections into a single elongated filter tube.

2. The machine of claim 1, in which certain other of said connecting means are of such length as to maintain adjacent filter segments separated to provide shorter filter tubes, whereby filter tubes of different lengths may be simultaneously provided.

3. The machine of claim 1, wherein said connecting means are in the form of connecting rods of various lengths removably attachable at each end to a roving guide.

4. The machine of claim 1, wherein the means to reciprocate the roving guides is a barrel cam, and including a connecting rod attached at one end to the nearest roving guide, and a cam rider carried by the other end of said connecting rod.

5. The machine of claim 1, wherein said connecting means comprise connecting rods of various lengths each selectively and removably attachable at opposite ends to adjacent roving guides, the shorter connecting rods causing overlapping of the reciprocatory paths of adjacent roving guides, and the longer connecting rods maintaining a separation between the paths of adjacent guides.

References Cited

UNITED STATES PATENTS

| | | | |
|---|---|---|---|
| 1,667,035 | 4/1928 | Hunermann | 138—155 X |
| 1,735,036 | 11/1929 | Caldwell | 242—42 |
| 1,865,075 | 6/1932 | Baker | 242—43 X |
| 1,915,200 | 6/1933 | Parks | 242—18 X |
| 2,207,615 | 7/1940 | Crandall | 242—35.5 X |
| 2,218,732 | 10/1940 | Waisman | 242—35.5 |
| 3,356,226 | 12/1967 | Miller et al. | 42—35.5 X |

FOREIGN PATENTS 328,786  1/1903  France.

STANLEY N. GILREATH, *Primary Examiner.*

Disclaimer and Dedication 3,398,905.—*Edward R. Adams* and *Jim L. Shepherd*, Lebanon, Ind., and *James V. Piacitelli*, Dedham, Mass. APPARATUS FOR MAKING FILTER TUBES. Patent dated Aug. 27, 1968. Disclaimer and dedication filed Sept. 3, 1969, by the assignee, *The Carborundum Company*.
Hereby disclaims and dedicates to the Public the entire term of said patent.
[*Official Gazette January 20, 1970.*]